United States Patent [19]
Ollivier

[11] Patent Number: 6,003,535
[45] Date of Patent: Dec. 21, 1999

[54] MICRO CONTROL VALVE AND APPARATUS AND METHOD FOR MAKING SEMICONDUCTORS WITH HIGH PURITY PROCESS GAS

[75] Inventor: Louis A. Ollivier, Palo Alto, Calif.

[73] Assignee: Veriflo Corporation, Richmond, Calif.

[21] Appl. No.: 08/646,140

[22] Filed: May 7, 1996

[51] Int. Cl.$^6$ .............................. F16K 31/04; F16K 1/02
[52] U.S. Cl. .................. 137/15; 251/122; 251/129.11; 251/205; 251/267; 251/335.3
[58] Field of Search .................................. 251/205, 208, 251/129.04, 129.11, 129.12, 120, 121, 122, 264, 266, 267, 335.2, 335.3

[56] References Cited

U.S. PATENT DOCUMENTS

| | | | |
|---|---|---|---|
| 3,727,406 | 4/1973 | LeFeuvre | 251/335.3 |
| 4,556,193 | 12/1985 | Yoshiga | 251/129.11 |
| 4,593,881 | 6/1986 | Yoshino | 251/129.11 |
| 4,609,176 | 9/1986 | Powers | 251/129.11 |
| 4,763,874 | 8/1988 | Ogawa | 251/129.11 |
| 4,815,699 | 3/1989 | Mueller | 251/335.3 |
| 4,986,085 | 1/1991 | Tischer | 251/129.11 |

*Primary Examiner*—George L. Walton
*Attorney, Agent, or Firm*—Antonelli, Terry, Stout & Kraus, LLP

[57] ABSTRACT

An improved continuously variable micro control valve and an apparatus and a method employing the same for making semiconductors enable a computer to precisely set a driver of the micro control valve such that the accuracy of the control valve in reproducing a flow value for a given setting of the driver is at least $1/1000$ of a maximum flow value for a relatively wide range of flow values which can be provided by the micro control valve. The relatively wide range of flow values is at least 1000 to 1 in a disclosed embodiment with a resolution sensitivity of the micro control valve being at least $1/10,000$ of the full scale of the relatively wide range of flow values. The improvement in repeatability and accuracy afforded by the micro control valve can result in higher yields in semiconductor making.

22 Claims, 4 Drawing Sheets

6,003,535

MICRO CONTROL VALVE AND APPARATUS AND METHOD FOR MAKING SEMICONDUCTORS WITH HIGH PURITY PROCESS GAS

FIELD OF THE INVENTION

The present invention is directed to an improved micro control valve for precisely controlling the flow of gas over a relatively wide range of flow values, and to an apparatus and method for making semiconductors with high purity process gas having improved accuracy in reproducing a flow value of the process gas to improve yields.

BACKGROUND AND SUMMARY OF THE INVENTION

Semiconductor manufacturing involves the use of process gas which is delivered from a supply of the process gas to the manufacturing tool through a system or apparatus that includes tubing, valves and a pressure regulator, for example. Increased emphasis is being placed on preserving the purity of the process gas as it travels through the delivery apparatus. Significant progress has been made by machining the surfaces in contact with the gas to a very fine finish, leaving out parts that contribute to particulate contamination such as a bias spring within the pressure regulator, and cleaning the delivery apparatus surfaces to insure a very low particle count, e.g. a small number of particles down to a size of 0.02 micron. Contamination of the process gas can adversely affect the quality of the semiconductors being made with the gas, lowering the yield from the manufacturing process.

Valves and pressure regulators for high purity applications have typically used Kel-F type fluorocarbon polymers for seats. Such plastics absorb moisture during valve and pressure regulator manufacture and release it slowly during their use in a dry gas system. Residual moisture levels required are currently less than ten parts per billion. As feature widths in semiconductors become smaller, e.g. less than 0.5 micron, the requirement for drier systems becomes increasingly important. To avoid contamination from moisture, valves and apparatus for delivering process gas for making semiconductors have been proposed which reduce moisture absorption inside the valve or apparatus by the total elimination of plastics and elastomers in contact with the gas being delivered by the valve or apparatus, as in the commonly assigned U.S. patent application Ser. Nos. 08/575,022 and 08/575,021, both filed Dec. 19, 1995 and now U.S. Pat. Nos. 5,755,428 and 5,762,086, respectively.

The accuracy, or lack thereof, with which the process gas can be supplied to the manufacturing tool can also impact the manufacturing process and yield. An improvement in repeatability and accuracy with which the process gas can be supplied to the manufacturing tool can result in higher yields from the manufacturing process. The accuracy of the control valve of a conventional mass flow controller in reproducing a flow value is typically $1/100$ of a maximum flow value of a range of flow values over which the flow of gas is controlled by the controller. The resolution sensitivity with this conventional control valve is typically $1/1000$ of the maximum flow value of the range of flow values. As feature widths in semiconductors become smaller, e.g. less than 0.5 micron, the need for accuracy of a control valve in reproducing a flow value becomes increasingly important.

An object of the present invention is to provide an improved micro control valve for precisely controlling the flow of gas over a relatively wide range of flow values, and an apparatus and method for making semiconductors with high purity process gas, having improved accuracy in reproducing a flow value of the process gas as compared with conventional control valves, apparatus and methods to thereby improve yields in making semiconductors.

These and other objects of the invention are attained by the improved micro control valve of the invention for precisely controlling the flow of gas over a relatively wide range of flow values. According to a disclosed, preferred embodiment of the invention, the micro control valve comprises means defining an orifice through which gas flow can be controlled, a valve cooperating with means defining an orifice, and a drive means which can be precisely set for effecting precise relative movement between the valve and the means defining an orifice for precisely controlling the flow of gas through the orifice over the relatively wide range of flow values. The means defining an orifice and the valve are configured, and the drive means effects sufficiently precise relative movement between the valve and the means defining an orifice, such that the accuracy of the control valve in reproducing a flow value for a given setting of the drive means is at least $1/1000$ of a maximum flow value of the relatively wide range of flow values. That is, the repeatability of the micro control valve of the present invention is an order of magnitude better than the aforementioned conventional control valve in a mass flow controller.

The micro control valve of the invention is further characterized in that a ratio of a maximum flow value to a minimum flow value of the relatively wide range of flow values over which the flow of gas can be accurately controlled, is at least 1000 to 1. The resolution sensitivity of the micro control valve of the invention is also an order of magnitude better than the aforementioned known control valve. That is, the resolution sensitivity of the precise control of the flow gas by the micro control valve of the present invention is at least $1/10,000$ of the maximum flow value of a relatively wide range of flow values over which the flow of gas is controlled by the micro control valve.

The drive means in the disclosed embodiments of the micro control valve comprise a driver which can be set to provide a precise rotational motion and a precision screw mechanism for converting the rotational motion of the driver into linear motion in a desired direction for effecting the relative movement between the valve and the means defining an orifice. A flexible coupling, rigid in torsion, is connected between the driver and the screw mechanism for coupling the rotational motion provided by the driver to the screw mechanism. This flexible coupling is preferably a zero-backlash coupling. The flexible coupling is a multiple convolution bellows in the disclosed embodiments. According to the preferred embodiment, the flexible coupling is axially displaced as it rotates for varying the flow of gas over the relatively wide range of flow values, the coupling having a relatively low spring rate to minimize a longitudinal force created by the displacement of the coupling as it rotates for varying the flow of gas. This longitudinal force is overcome by the force from a bias spring of the valve which longitudinally loads the screw mechanism in the direction of the driver to take up play in the screw mechanism for minimizing hysteresis during operation of the control valve.

The control valve further includes means for aligning the screw mechanism in the valve for providing the linear motion in the desired direction. According to the preferred embodiment, the screw mechanism is a differential screw mechanism. In a second embodiment, a single screw mechanism is employed to provide a linear motion of less than or equal to 0.020 inch per complete turn of the rotational motion input from the driver to the screw mechanism.

A flexible metal diaphragm is mounted in a valve body of the micro control valve for movement toward and away from the means defining an orifice. The valve is connected to a central portion of this diaphragm and to the linear motion output of the screw mechanism. Means are provided for clamping the flexible diaphragm at its periphery into gas sealing contact with the valve body. In the disclosed embodiments this provides metal to metal contact between the flexible metal diaphragm and the metal valve body sealing the gas passage through the valve to atmosphere to prevent contamination by inboard leakage thereby maintaining high purity of the process gas.

The orifice which is adjustably throttled by the valve is formed in an insert in the valve body in the disclosed embodiments. The annular orifice linearly extends along an axis. The valve is in the form of a tapered needle projecting from the diaphragm, the valve being elongated in a direction along the axis of the orifice and tapered at a relatively small angle to the axis. The drive means precisely moves the valve along the axis of the orifice relative to the insert for precisely controlling the flow of gas through the orifice over the relatively wide range of flow values. The diaphragm and screw mechanism are accurately aligned in the valve for providing the linear motion in the desired direction along the axis.

A method of the present invention for making semiconductors comprises providing a supply of pressurized process gas for making semiconductors, regulating the pressure of process gas from the supply of process gas and controlling the flow of the pressure regulated process gas to a processing equipment for making semiconductors, wherein the flow of the pressure regulated process gas to the processing equipment is controlled over a relatively wide range of flow values with a continuously variable micro control valve having a driver which can be precisely set, the micro control valve having an accuracy in reproducing a flow value for a given setting of the driver of at least $1/1000$ of a maximum flow value of the relatively wide range of flow values. As a result, relatively high yields in semiconductor making are possible. According to the preferred embodiment of the method, the step of precisely setting the driver of the micro control valve is performed by means of a computer for controlling the process gas supplied to the processing equipment.

An apparatus of the invention for making semiconductors comprises a source of process gas used in making semiconductors, a processing equipment for making semiconductors to which the process gas is to be supplied, and a micro control valve of the present invention for precisely controlling the flow of process gas over a relatively wide range of flow values from the source of process gas to the processing equipment for making semiconductors. The micro control valve has an accuracy in reproducing a flow value for a given setting of the drive means of the control valve which is at least $1/1000$ of a maximum flow value of the relatively wide range of flow values.

These and other objects, features and advantages of the present invention will become more apparent from the following detailed description of two disclosed embodiments of the present invention illustrated in the accompanying drawings.

DETAILED DESCRIPTION OF DISCLOSED EMBODIMENTS

Figure 1:
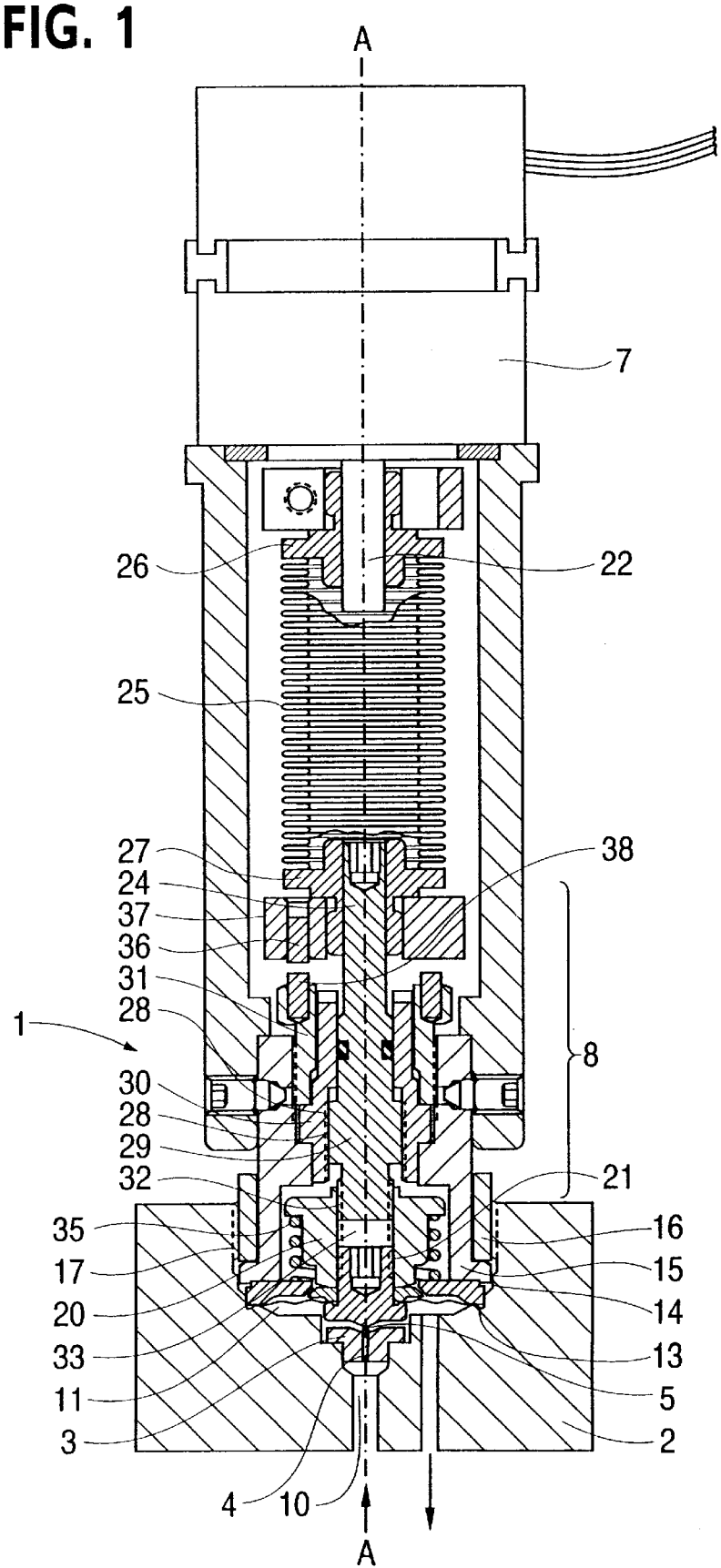
FIG. 1 is a side view, partially in cross-section through a longitudinal center axis A—A, of a continuously variable micro control valve according to a preferred embodiment of the present invention.
Figure 2:
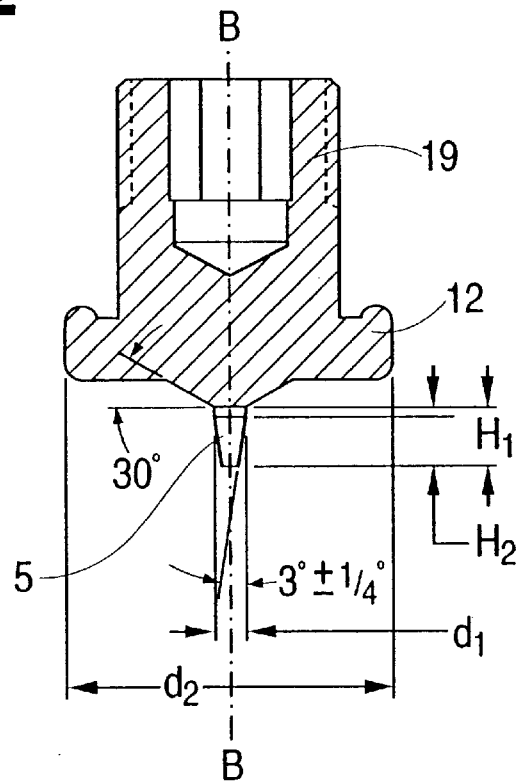
FIG. 2 is an enlarged cross-sectional view of the valve of the micro control valve of FIG. 1, taken along a longitudinal center axis B—B of the valve.
Figure 3:
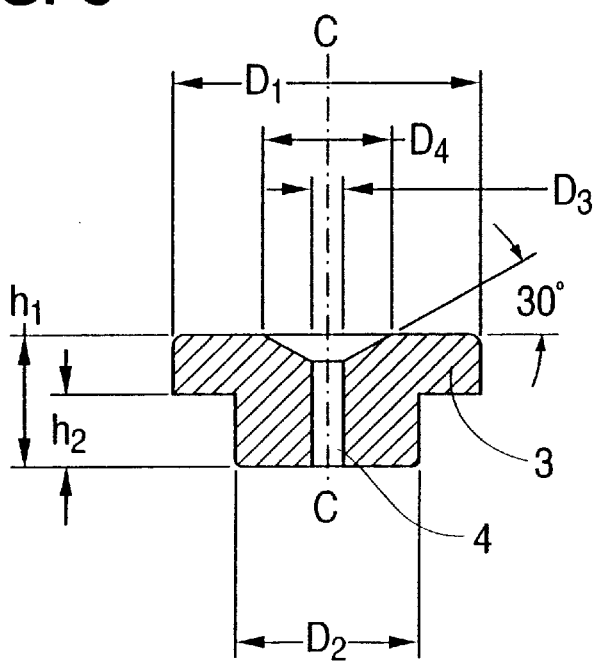
FIG. 3 is an enlarged cross-sectional view through a longitudinal center axis C—C of an insert containing an orifice which is used in combination with the valve of FIG. 2 in the micro control valve of FIG. 1.

Referring now to the drawings, a micro control valve 1 according to a preferred embodiment of the invention is depicted in FIGS. 1–3. The micro control valve comprises a main valve body 2 which includes an insert 3 defining an orifice 4 through which gas flow can be controlled. A valve 5 cooperates with the insert 3 defining orifice 4 for adjustably throttling the orifice and the flow of gas through the valve from an inlet to an outlet denoted by the arrows in FIG. 1. The micro control valve 1 further comprises a drive means 6 which can be precisely set for effecting precise relative movement between the valve 5 and the insert 3 defining orifice 4 for precisely controlling the flow of gas through the orifice over a relatively wide range of flow values.

The insert 3 defining orifice 4 and the valve 5 are configured and the drive means 6 effects sufficiently precise relative movement between the valve 5 and the insert 3 defining orifice 4 such that the accuracy of the micro control valve 1 in reproducing a flow value for a given setting of the drive means 6 is at least $1/1000$ of the maximum flow value of the relatively wide range of flow values. In the disclosed embodiments the relatively wide range of flow values is such that a ratio of a maximum flow value to a minimum flow value of the range of flow values is at least 1000 to 1. Further, a resolution sensitivity of the precise control of the flow of gas by the micro valve of the two disclosed embodiments is at least $1/10,000$ of the maximum flow value of the relatively wide range of flow values. Thus, the accuracy of the micro control valve and the resolution sensitivity therewith are at least an order of magnitude better than the aforementioned conventional control valve with mass flow controller of the prior art.

Figure 4:
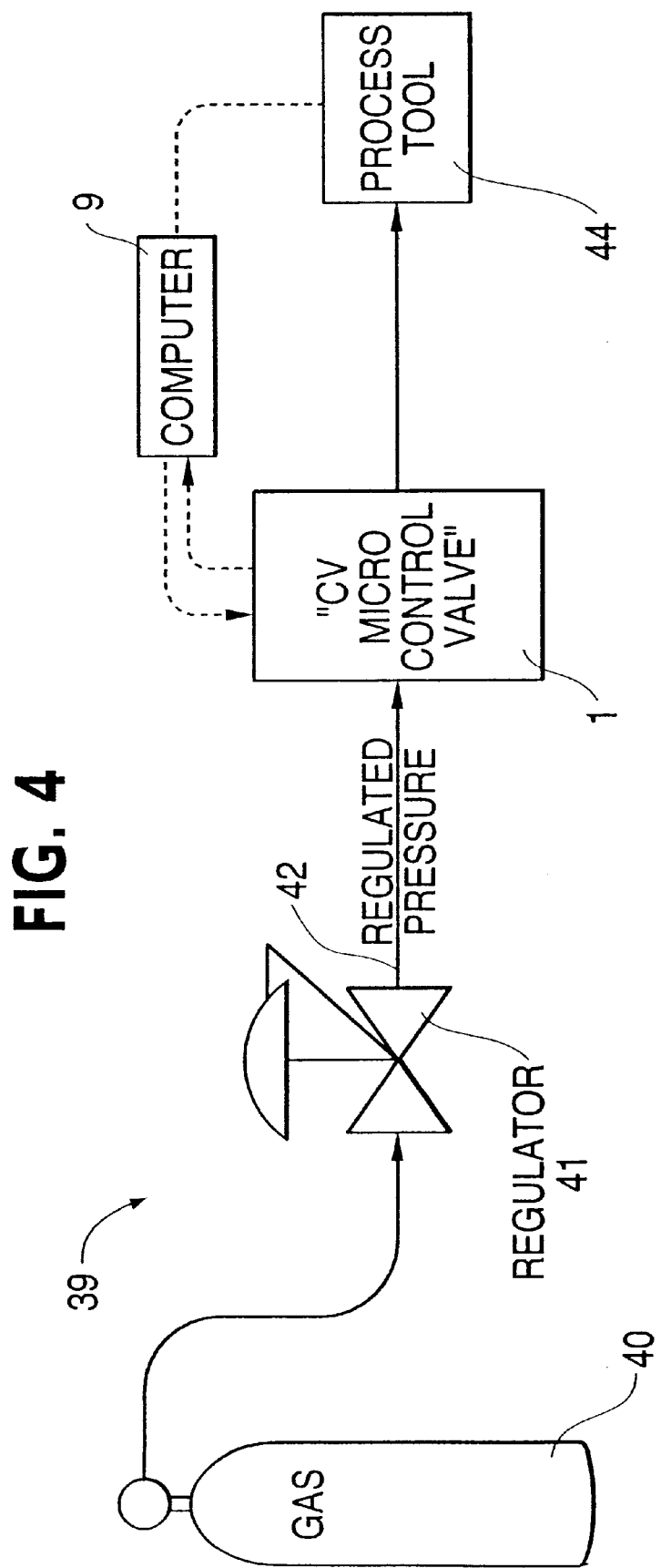
FIG. 4 is a block diagram of an apparatus of the invention for making semiconductors using a micro control valve according to the present invention.

More particularly, the drive means 6 in the embodiment of FIGS. 1–3 comprises a driver 7 in the form of a micro stepping motor which can be set by means of computer 9, FIG. 4, to provide a precise rotational motion, and a precision screw mechanism 8 for converting the rotational motion of the driver 7 into linear motion in a desired direction along axis A—A in FIG. 1 for effecting relative movement between the valve 5 and the insert 3 defining orifice 4. The micro stepping motor 7 can be accurately controlled with 25,000 to 50,000 steps per revolution. The precise setting of the micro stepping motor 7 of the micro control valve 1 is directed to produce a required gas flow rate, or a required gas pressure, by means of the computer 9 which supplies signals to the micro stepping motor 7 to achieve the required flow or pressure as discussed further below.

The insert 3, shown enlarged in FIG. 3, is formed of 316 stainless steel with a flanged, annular configuration as depicted in the cross-section of FIG. 3. The height $h_1$ of the insert is 0.160 inch and an outer diameter $D_1$ is 0.350 inch. The cylindrical base of the insert has a diameter $D_2$ of 0.2200+0.0005−0.0000 inch for reception in the upper end of a stepped, cylindrical inlet passage 10 of the valve body 2 where the insert 3 is connected to the valve body 2, also formed of 316 stainless steel, as by welding. The orifice 4 of the insert 3 is in the form of a cylindrical bore extending along the central axis C—C of the insert 3 and having a diameter $D_3$ of 0.0310+0.0005−0.0000 inch diameter. When the insert is connected to the valve body 2 as shown in FIG. 1, the axis C—C of the orifice 4 is coincident with the central longitudinal axis A—A of inlet passage 10. The upper end of the orifice 4 is flared outwardly at an angle of 30° to the upper surface of the insert as shown in FIG. 3, where the outer diameter $D_4$ of the flared portion is 0.150 inch. The height $h_2$ of the cylindrical base of the insert 3 is 0.090 inch in the disclosed embodiment.

The needle-like end of valve 5 is elongated in a direction along the axis A—A of the orifice 4 as depicted in FIG. 1. As shown more clearly in FIG. 2, the needle-like end of valve 5 is also tapered at a relatively small angle, 3°+0°, −1/40 to this axis over most of its length. The valve 5 is connected to a central portion of a flexible metal diaphragm 11, also formed of 316 stainless steel. The connection between the radially inner portion of the diaphragm 11 and a flange 12 of the valve 5 can be made by welding, for example. The height $H_1$ of the needle-like portion of valve 5 is 0.070±0.002 inch, being cylindrical at its base for a height $H_2$ of 0.010±0.001 inch from where it tapers downwardly to its free end at a relatively small angle to the axis B—B, 3°±1/40 as shown in FIG. 2, from a diameter $d_1$ of 0.0320+0.0005−0.0000 inch. The outside diameter $d_2$ of the flange 12 of the valve is 0.380±0.002 inch in the illustrated embodiment.

The outer periphery of the flexible metal diaphragm 11 is gas sealingly pressed against an annular protrusion 13 of the valve body 2 by means of a cap 14 which in turn is downwardly biased by a cap 15 and a threaded ring 16 engaging cooperating screw threads formed on the wall of annular recess 17 of the valve body 2. Thus, a metal to metal seal is formed between the outer periphery of the metal diaphragm 11 and the annular protrusion 13 to prevent contamination of the pressurized gas being conveyed through the control valve 1 by ingress of atmospheric contaminates. A central, annular portion 19 extending from the valve 5 above the flange 12 is threadedly connected with a flanged nut 20 at cooperating screw threads 21 centered about the axis A—A as shown in FIG. 1. The threaded connection between the flanged nut 20 and the central annular portion 19 of the valve 5 may be made permanent as by welding.

The precision screw mechanism 8 which converts the rotational motion of the output shaft 22 of micro stepping motor 7 into linear motion in a direction along the axis A—A for effecting relative movement between the valve 5 and the insert 3 defining orifice 4, is a differential screw mechanism in the disclosed embodiment. The rotational motion provided by the driver 7 is coupled to the upper end of a stem 24 of the differential screw mechanism 8 by a flexible coupling 25 which is rigid in torsion. In the disclosed embodiment, the flexible coupling is a zero-backlash coupling, particularly a multiple convolution metal bellows. The bellows 25 is rigid in torsion but will extend along the axis of symmetry of the bellows with translation of the stem 24 along the axis A—A. Hubs 26 and 27 at respective ends of the bellows 25 are non-rotatably connected to the output shaft 22 of driver 7 and the upper end of stem 24, respectively as shown in FIG. 1.

The differential screw mechanism 8 comprises a first screw 28 between cooperating threads on a flanged middle portion 29 of stem 24 and on the radially inner surface of a stationary retainer 30 which is supported by and aligned with respect to the axis A—A of the micro control valve by an upper extension of the cap 15 and a threaded retaining ring 31 threadedly received in a central aperture in the upper end of cap 15 to axially clamp the retainer 30 and prevent rotation thereof. The cooperating threads of the first screw 28, 3/8-36, cause upward or downward translation of the stem 24 along the axis A—A relative to the stationary retainer 30 when the stem 24 is rotatably driven by the driver 7 by way of the flexible coupling 25.

A second screw 32, 1/4-48, of the differential screw mechanism 8 is located between the lower end of the stem 24 and a central threaded aperture 33 of the non-rotatable flanged nut 20. Upon relative rotation between the stem 24 and the nut 20, the cooperating threads of the screw 32 act to displace the flanged nut 20 and the assembly of the central portion of the diaphragm with valve 5 linearly along the axis A—A at a slower rate and in an opposite direction to the translation of the stem 24 being caused by the cooperating threads of the first screw 28. Thus, the travel of the valve 5 is controlled by the differential screw mechanism 8 which provides a nominal displacement of only 0.007 inch for one complete turn of the stem 24.

The alignment of the valve 5, orifice 4 and screw mechanism 8 is set and preserved by the guidance of the diaphragm assembly and of the connected driving stem 24. The alignment is set by engaging the valve 5 into the orifice 4 of the insert 3 and clamping the outer periphery of the diaphragm in that condition. The upper extension of the stem 24 is guided by an O-ring 34 within the central aperture through stationary retainer 30. The axial play in the first screw 28 and the second screw 32 of the precision screw mechanism 8 is taken up by a force created by a bias coil spring 35 upwardly biasing the diaphragm assembly at a location between the lower surface of the flange of nut 20 and an upper surface of cap 14 of the valve as depicted in FIG. 1.

The bias force from the spring 35 is selected to be greater than any force created by extension or compression of the flexible bellows 25 along the axis A—A. That is, the flexible coupling 25 preferably has a relatively low spring rate to minimize the longitudinal force created by the displacement of the flexible coupling as it rotates for varying the flow of gas. By longitudinally loading the screw mechanism in the direction of the driver 7 with bias spring 35, hysteresis in operation of the micro control valve 1 can be minimized during operation of the control valve to precisely control the flow of gas over the relatively wide range of flow values. In the disclosed embodiment the metal bellows 25 has a nominal spring rate of 11 pounds/inch corresponding to a force of 6/36×11=1.8 pound for a full scale, six turn rotation of the stem 24 by the driver 7.

A positive stop is provided to prevent the driver 7 from distorting the valve 5 and the valve seat formed by insert 3 as the valve closes for providing the minimum flow of the relatively wide range of flows which can be provided by the control valve 1. For this purpose, a first pin 36 is inserted in a clamp 37 about the hub 27 coupling the bellows 25 and stem 24. The pin 36 comes to rest against a second pin 38 inserted in the upper end of threaded retaining ring or cap 31 to stop the downward travel of stem 34 and valve 5 for minimum flow. The stop is set so that the pins 36 and 38 clear after the first turn of opening.

An apparatus 39 of the present invention for making semiconductors is depicted in FIG. 4 of the drawings. The apparatus comprises a source 40 of process gas used in making semiconductors. The source 40 is in the form of a high pressure cylinder in the disclosed embodiment but could take other forms. A regulator 41 decreases the gas pressure from the source 40 to a predetermined pressure, which is then regulated to a stable value. For example, gas pressures of 500–2000 psi in source 40 are reduced and regulated to provide gas inlet pressures of 30 to 100 psi to the inlet passage 10 in the main valve body 2 of the micro control valve 1 downstream of the regulator along gas line 42. The micro control valve provides outlet pressures from control valve 1 to full vacuum, supplying the gas from its outlet to the process tool 44 at the desired rate or pressure depending upon the setting of the driver. In the disclosed embodiment the driver of the micro control valve can be precisely set to provide a range of flow values of from 5 to 5000 ml/min. Another configuration using an 8° taper on the valve with a 0.060 inch diameter orifice results in flows over a range of from 20 to 20,000 ml/min. The control valve 1 has a low hysteresis of less than 1/5000 full scale.

The accuracy of the micro control valve 1 in reproducing a flow value for a given setting of the driver 7 over the relatively wide range of flow values is at least 1/1000 of a maximum flow value of the range of flow values. Thus, in this first example above the accuracy in reproducing a flow value is at least 1/1000 of 5000 ml/min., or at least within 5 ml/min., while the resolution sensitivity is at least 1/10,000 of the maximum flow value, or at least within 0.5 ml/min. These values for accuracy and resolution sensitivity are an order of magnitude better than those for the conventional control valve referred to above.

The continuously variable micro control valve 1, as described above with respect to FIGS. 1–3, is directed to maintain a required gas flow rate or required gas pressure, by means of the computer 9 which supplies signals to the micro stepping motor of the driver 7 of the control valve to achieve the required flow or pressure. The controlled process gas is then supplied to semiconductor manufacturing equipment, process tool 44 as depicted in FIG. 4. The directions for the desired setting of the drive 7 can be input to the computer 9 by the operator based on predetermined supply characteristics for the control valve for a particular gas and supply pressure to the control valve. This process could also be performed automatically through suitable programming of the computer, optionally with feed back information from both process tool 44 and micro control valve 1 as will be readily understood by the skilled artisan.

Figure 5:
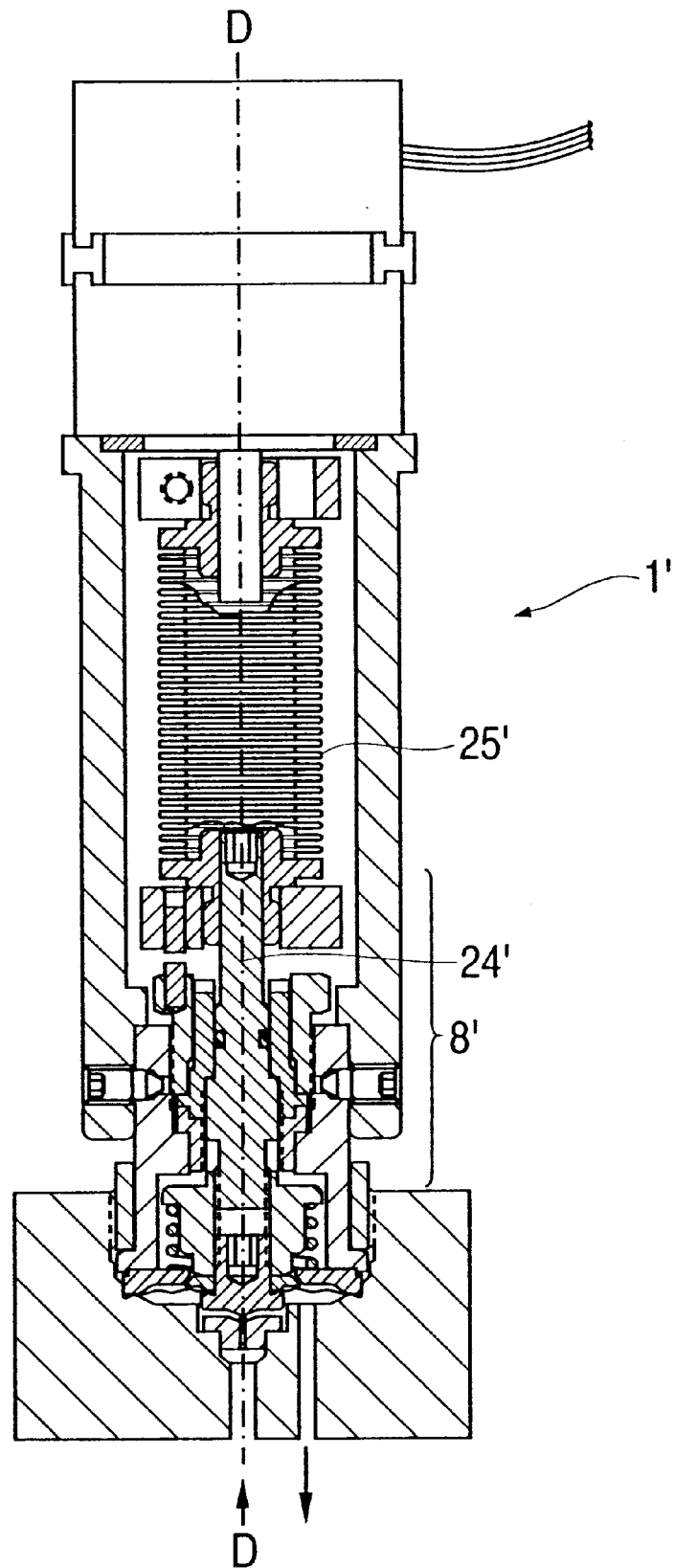
FIG. 5 is a side view, partially in cross-section through a longitudinal center axis D—D, of a continuously variable micro control valve according to a second embodiment of the invention.

In another form of the invention, illustrated in FIG. 5, the micro control valve 1$^1$ of the invention includes a precision screw mechanism 8$^1$ in the form of a single screw mechanism, ¼-48, which provides a nominal displacement of 0.020 inch for one turn of the stem 24'. In this embodiment, the stem 24$^1$ is not longitudinally displaced but merely rotates in retainer 30'. This makes it possible to use a shorter flexible coupling 25$^1$ since it makes no contribution to the longitudinal force. Otherwise, the alignment of the screw mechanism and the bias spring taking up the play therein are preserved. From a functional standpoint, there is a decrease in sensitivity of setting with the single screw mechanism 8$^1$ as compared with the differential screw mechanism 8 in the preferred embodiment of FIGS. 1–3: 0.020 inch linear displacement per turn of the stem instead of 0.007 inch per turn, i.e. approximately two turns full scale instead of six turns full scale as in the embodiment of FIGS. 1–3. It is also noted that a single standard right hand thread in screw mechanism 8' will give the opposite action of the differential screw mechanism 8. Turning the driving stem 24$^1$ clockwise will open the micro control valve 1$^1$ instead of closing it. If the normal action for a valve, clockwise to close, is desired, the screw mechanism 8' of the micro control valve 1' should be provided with a left hand screw.

From the above, it can be seen that a method of making semiconductors according to the present invention comprises providing a supply 40 of pressurized process gas for making semiconductors, regulating the pressure of process gas from the supply of process gas using regulator 41 and controlling the flow of pressure regulated process gas to a processing equipment 44 for making semiconductors, wherein the step of controlling the flow of the pressure regulated process gas to the processing equipment includes using a continuously variable micro control valve having a driver which can be precisely set to control the flow over a relatively wide range of flow values. The valve has an accuracy in reproducing a flow value for a given setting of the driver of at least 1/1000 of a maximum flow value of the relatively wide range of flow values whereby relatively high yields in semiconductor making are possible. The step of precisely setting the driver of the micro control valve is preferably accomplished by means of a suitably programmed computer for controlling the process gas supplied to the processing unit according to the preferred embodiment.

The present invention has been described with respect to two disclosed embodiments of the invention but variations thereof are possible without departing from the scope of the present invention as will be readily understood by one skilled in the art. For example, the screw pitch in the single screw mechanism 8$^1$ of the embodiment of FIG. 5 can vary from the 48 pitch of the disclosed embodiment to 80 or higher. The finer the pitch the better the resolution although the finer the pitch the more difficult it is to make the screw mechanism. The driver 7 in the disclosed embodiments is a micro stepping motor but other drivers could be employed, for example, coreless DC motors in a servo loop, using various feedback devices such as digital encoders for digital feedback and multi-turn potentiometers for analog feedback-convertible into digital data via an electronic A to D converter, as will be understood by the skilled artisan.

The continuously variable micro control valve of the present invention can be used in any system requiring extremely high resolution over a wide range of flows. The resolution is approximately ten times greater than existing control valves. In addition, the micro control valve is easily driven by a computer, with all of the power of that computer available to shape the control function and to correct any residual errors in operation through direct operator observation and adjustment or input to the computer, or automatically with feedback information and according to a suitable program of the computer. Thus, while the preceding specific embodiments are illustrative of the practice of the invention, it is to be understood that other expedients known to those skilled in the art and not disclosed herein may be employed without departing from the spirit of the invention or the scope of the appended claims.

I claim:

1. A micro control valve for precisely controlling the flow of gas over a relatively wide range of flow values, said micro control valve comprising means defining an orifice through which gas flow can be controlled, a valve cooperating with said means defining an orifice, a valve body, a flexible metal diaphragm mounted in said valve body, said flexible metal diaphragm having a central portion movable toward and away from said means defining an orifice, said valve being connected to said central portion of said diaphragm for movement therewith relative to said means defining an orifice, said diaphragm precisely aligning and guiding said valve with respect to said means defining an orifice during said movement, and drive means connected to said valve for effecting said movement, wherein said drive means can be precisely set for effecting precise relative movement between said valve and said means defining an orifice for precisely controlling the flow of gas through said orifice over said relatively wide range of flow values, said means defining an orifice and said valve being configured and said drive means effecting sufficiently precise relative movement between said valve and said means defining an orifice such that the accuracy of said control valve in reproducing a flow value for a given setting of said drive means is at least $\frac{1}{1000}$ of a maximum flow value of said relatively wide range of flow values.

2. The micro control valve according to claim 1 wherein a ratio of a maximum flow value to a minimum flow value of said relatively wide range of flow values is at least 1000 to 1.

3. The micro control valve according to claim 1, wherein a resolution sensitivity of the precise control of the flow of gas by said micro control valve is at least $\frac{1}{10,000}$ of the maximum flow value of said relatively wide range of flow values.

4. The micro control valve according to claim 1, wherein said drive means comprises a driver which can be set to provide a precise rotational motion and a precision screw mechanism for converting said rotational motion of said driver into linear motion in a desired direction for effecting said relative movement between said valve and said means defining an orifice.

5. The micro control valve according to claim 4, further comprising a flexible coupling, rigid in torsion, connected between said driver and said screw mechanism for coupling the rotational motion provided by said driver to said screw mechanism.

6. The micro control valve according to claim 5, wherein said flexible coupling is a zero-backlash coupling.

7. The micro control valve according to claim 5, wherein said flexible coupling is a multiple convolution bellows.

8. The micro control valve according to claim 5, wherein said flexible coupling is displaced as it rotates for varying the flow of gas over said relatively wide range of flow values, said coupling having a relatively low spring rate to minimize a longitudinal force created by the displacement of said coupling as it rotates for varying the flow of gas.

9. The micro control valve according to claim 4, further comprising means for aligning said screw mechanism in said micro control valve for providing said linear motion in said desired direction.

10. The micro control valve according to claim 4, further comprising a bias spring longitudinally loading said screw mechanism in the direction of said driver for minimizing hysteresis during operation of said control valve to precisely control the flow of gas over said relatively wide range of flow values.

11. The micro control valve according to claim 4, further comprising a stop to halt the operation of said screw mechanism and in turn the relative motion between said valve and said means defining an orifice for establishing a minimum flow value of said relatively wide range of flow values without distorting said valve and said means defining an orifice.

12. The micro control valve according to claim 4, wherein said screw mechanism is a differential screw mechanism.

13. The micro control valve according to claim 4, wherein said screw mechanism is a single screw mechanism.

14. The micro control valve according to claim 4, wherein said screw mechanism provides a linear motion of less than or equal to 0.020 in. per complete turn of the rotational motion input from said driver to said screw mechanism.

15. The micro control valve according to claim 4, wherein said valve is connected to the linear motion output of said screw mechanism on a side of the diaphragm opposite said means defining an orifice.

16. The micro control valve according to claim 15, further comprising means for clamping said flexible diaphragm at its periphery into gas sealing contact with said valve body.

17. The micro control valve according to claim 1, wherein said orifice extends along an axis, said valve being elongated in a direction along said axis and tapered at a relatively small angle to said axis, said drive means precisely moving said valve along the axis of said orifice for precisely controlling the flow of gas through said orifice over said relatively wide range of flow values.

18. An apparatus for making semiconductors comprising a source of process gas used in making semiconductors, a processing equipment for making semiconductors to which said process gas is to be supplied, and a micro control valve for precisely controlling the flow of process gas over a relatively wide range of flow values from said source of process gas to said processing equipment for making semiconductors, said micro control valve comprising means defining an orifice through which gas flow can be controlled, a valve cooperating with said means defining an orifice, a valve body, a flexible metal diaphragm mounted in said valve body, said flexible metal diaphragm having a central portion movable toward and away from said means defining an orifice, said valve being connected to said central portion of said diaphragm for movement therewith relative to said means defining an orifice, said diaphragm precisely aligning and guiding said valve with respect to said means defining an orifice, and a drive means connected to said valve for effecting said movement, wherein said drive means can be precisely set for effecting precise relative movement between said valve and said means defining an orifice for precisely controlling the flow of gas through said orifice over said relatively wide range of flow values, said means defining an orifice and said valve being configured and said drive means effecting sufficiently precise relative movement between said valve and said means defining an orifice such that the accuracy of said control valve in reproducing a flow value for a given setting of said drive means is at least $\frac{1}{1000}$ of a maximum flow value of said relatively wide range of flow values.

19. The apparatus according to claim 18, further comprising control means for precisely setting said drive means.

20. In a method of making semiconductors comprising providing a supply of pressurized process gas for making semiconductors, regulating the pressure of process gas from said supply of process gas and controlling the flow of the pressure regulated process gas to a processing equipment for making semiconductors, the improvement comprising controlling the flow of the pressure regulated process gas to said processing equipment over a relatively wide range of flow values wherein a ratio of a maximum flow value to a minimum flow value of said relatively wide range is at least 1000 to 1 with a continuously variable micro control valve having a driver which can be precisely set for adjustably throttling the flow of gas through the control valve with an accuracy in reproducing a flow value for a given setting of said driver of at least $\frac{1}{1000}$ of a maximum flow value of said relatively wide range of flow values and wherein a resolution sensitivity of said controlling of the flow with said control valve is at least 1/10,000 of the maximum flow value of said relatively wide range of flow values whereby relatively high yields in making semiconductors are possible.

21. The method according to claim 20, including the step of precisely setting said driver of the micro control valve by means of a computer for controlling the process gas supplied to the processing equipment.

22. A continuously variable micro control valve for precisely controlling the flow of gas over a relatively wide range of flow values for high purity applications such as making semiconductors, said micro control valve comprising a valve body having means defining a orifice through which gas flow can be controlled, a valve cooperating with said means defining an orifice, driver means which can be precisely set for effecting precise movement of said valve relative to said means defining an orifice for precisely controlling the flow of gas through said orifice over said relatively wide range of flow values, said driver means comprising a driver which can be set to provide a precise rotational motion and a screw mechanism for converting said rotational motion of said driver into linear motion in a desired direction for moving said valve relative to said means defining an orifice, a flexible coupling rigid in torsion being connected between said driver and said screw mechanism for coupling the rotational motion provided by said driver to said screw mechanism, means for aligning said screw mechanism for providing said linear motion in said desired direction, a bias spring longitudinally loading said screw mechanism in the direction of said driver for minimizing hysteresis during operation of the central valve, a flexible diaphragm mounted in said valve body, said diaphragm having a central portion movable toward and away from said means defining an orifice, said valve being connected to said central portion of said diaphragm and to the linear motion output of said screw mechanism for movement therewith relative to said means defining an orifice, said diaphragm precisely aligning and guiding said valve with respect to said means defining an orifice during said movement, and means for clamping said flexible metal diaphragm at its periphery into gas sealing contact with said valve body.

\* \* \* \* \*